(12) United States Patent
Greenwood

(10) Patent No.: US 10,596,770 B2
(45) Date of Patent: Mar. 24, 2020

(54) ARROW SHAFT WITH INTERNAL BRACING

(71) Applicant: Aldila Golf Corporation, Carlsbad, CA (US)

(72) Inventor: Stephen Greenwood, Brea, CA (US)

(73) Assignee: Aldila Golf Corporation, Carlsbad, CA (US)

( * ) Notice: Subject to any disclaimer, the term of this patent is extended or adjusted under 35 U.S.C. 154(b) by 0 days.

(21) Appl. No.: 15/639,849

(22) Filed: Jun. 30, 2017

(65) Prior Publication Data

US 2018/0003471 A1 Jan. 4, 2018

Related U.S. Application Data

(60) Provisional application No. 62/357,767, filed on Jul. 1, 2016.

(51) Int. Cl.
*B29C 70/32* (2006.01)
*B29C 33/42* (2006.01)
*F42B 6/04* (2006.01)
*B29C 70/30* (2006.01)
*B29C 53/04* (2006.01)

(52) U.S. Cl.
CPC .............. *B29C 70/32* (2013.01); *B29C 33/42* (2013.01); *B29C 33/424* (2013.01); *B29C 53/043* (2013.01); *B29C 70/30* (2013.01); *F42B 6/04* (2013.01)

(58) Field of Classification Search
CPC ......... B29C 33/42; B29C 70/30; B29C 70/32; B29C 70/347; B29C 53/587
See application file for complete search history.

(56) References Cited

U.S. PATENT DOCUMENTS

| | | | | | |
|---|---|---|---|---|---|
| 3,972,529 | A | * | 8/1976 | McNeil | ................. A63B 53/12 |
| | | | | | 473/320 |
| 4,234,190 | A | * | 11/1980 | Airhart | ..................... F42B 6/04 |
| | | | | | 273/DIG. 23 |
| 5,273,293 | A | | 12/1993 | Lekavich | |
| 6,395,210 | B1 | * | 5/2002 | Head | ..................... B29C 70/525 |
| | | | | | 264/137 |

(Continued)

FOREIGN PATENT DOCUMENTS

JP 11243815 A * 9/1999

*Primary Examiner* — Atul P. Khare
(74) *Attorney, Agent, or Firm* — Stroock & Stroock & Lavan LLP

(57) ABSTRACT

The present invention is a lightweight archery arrow having an arrow shaft with internal bracing, an arrow tip, and a nock. The arrow shaft with internal bracing is a cylindrical tube having a plurality of ribs formed along the length of the cylindrical tube. The ribs increase the bending stiffness of the cylindrical tube without adding additional thickness and weight. Due to the increased bending stiffness of the cylindrical tube provided by the ribs the wall thickness of the cylindrical tube may be reduced while still maintaining the bending stiffness comparable to that of an arrow shaft having a thicker wall. The decrease in wall thickness and the reduction of material reduces the weight of the arrow shaft providing an arrow shaft with an exterior diameter and bending stiffness comparable to that of a standard arrow shaft, but being lighter in weight.

15 Claims, 9 Drawing Sheets

(56) References Cited

U.S. PATENT DOCUMENTS

| | | | | |
|---|---|---|---|---|
| 6,595,880 B2* | 7/2003 | Becker | F42B 6/04 | |
| | | | 124/44.5 | |
| 7,220,492 B2* | 5/2007 | Fick | B22D 19/14 | |
| | | | 428/293.1 | |
| 7,686,714 B2 | 3/2010 | Smith | | |
| 7,780,546 B2* | 8/2010 | Oldenburg | A63B 53/10 | |
| | | | 473/319 | |
| 8,915,806 B2 | 12/2014 | Asherman | | |
| 9,297,620 B2* | 3/2016 | Boretto | F42B 6/04 | |
| 9,829,291 B2* | 11/2017 | Boretto | F42B 6/04 | |
| 2002/0166595 A1* | 11/2002 | Lindsay | A63B 53/10 | |
| | | | 138/153 | |
| 2005/0079926 A1* | 4/2005 | Oldenburg | A63B 53/12 | |
| | | | 473/323 | |
| 2006/0084534 A1* | 4/2006 | Flowers | F42B 6/04 | |
| | | | 473/578 | |
| 2006/0281593 A1* | 12/2006 | Young | A01K 87/00 | |
| | | | 473/578 | |
| 2008/0207362 A1* | 8/2008 | Kuhn | F42B 6/04 | |
| | | | 473/586 | |
| 2013/0170900 A1* | 7/2013 | Bay | F16B 7/025 | |
| | | | 403/343 | |
| 2015/0141180 A1* | 5/2015 | Connolly | F42B 6/04 | |
| | | | 473/578 | |
| 2016/0076862 A1* | 3/2016 | Connolly | B29C 70/32 | |
| | | | 473/578 | |
| 2017/0052007 A1* | 2/2017 | Syverson | F42B 6/04 | |

\* cited by examiner

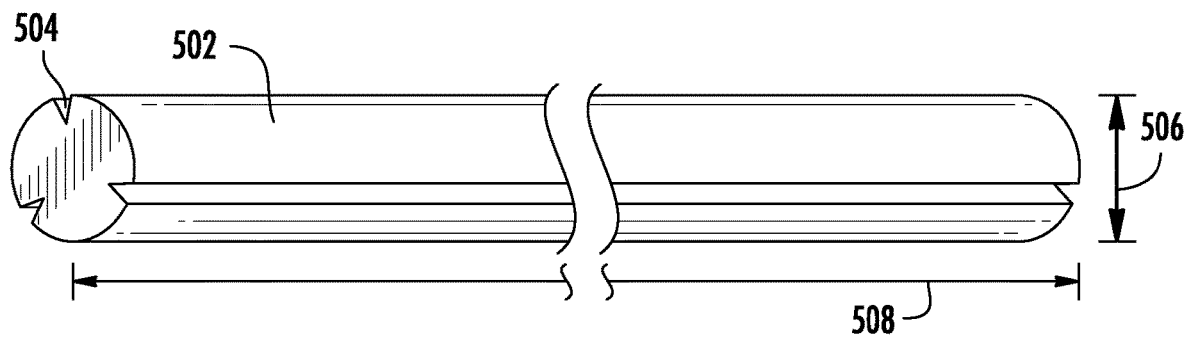
FIG. 13
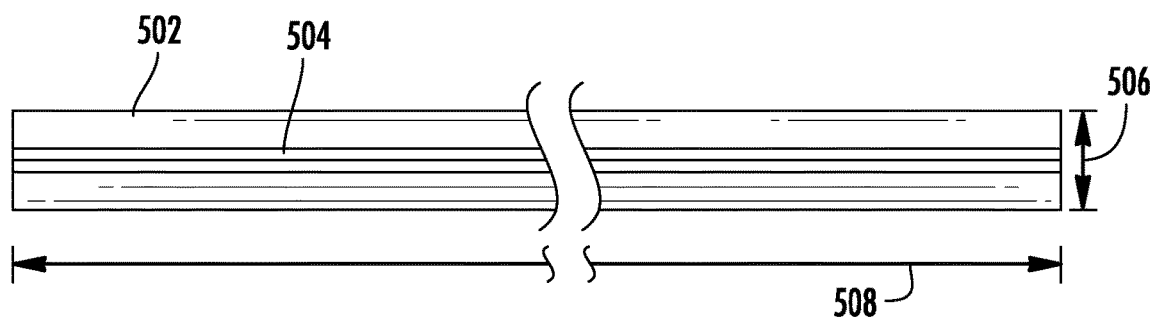
FIG. 14
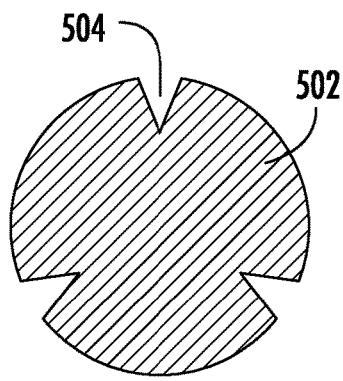　　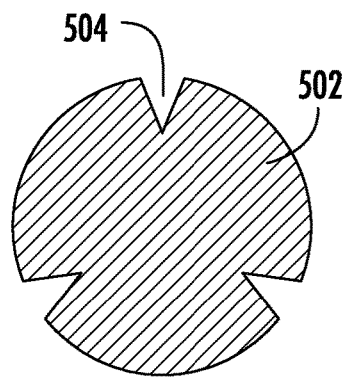
FIG. 15　　　　　　　　FIG. 16

ARROW SHAFT WITH INTERNAL BRACING

CROSS-REFERENCE TO RELATED APPLICATION

This application claims the benefit of U.S. Provisional Application No. 62/357,767 filed Jul. 1, 2016.

FIELD OF THE INVENTION

The disclosure relates to archery arrows, arrow shafts, and crossbow bolts. The invention particularly relates to internally fluted arrow shafts and their related components as well as methods of manufacturing arrow shafts and crossbow bolts with fluted internal diameters or bracing.

BACKGROUND

In the archery industry, there is a consistent drive to manufacture arrows having decreased weight and increased durability. Traditionally, arrow shafts were made from lightweight wood, bamboo, and reeds. To decrease their weight and produce arrows that are easier to shoot and that can fly farther, modern arrows are made from aluminum and fiber reinforced plastic. Carbon fiber, a type of fiber reinforced plastic, has been used since the 1990s as a lightweight material used to make arrows. While modern materials are lighter in weight than traditional materials, modern materials are not as durable. Moreover, while modern materials are lighter, there is a consistent pursuit to decrease arrow weight.

Modern arrows are typically made from a carbon fiber arrow shaft that is hollow, and include an arrow tip in the front of the arrow shaft, a nock in the rear of the arrow shaft, and fletching along the surface of the arrow shaft adjacent the nock. In flight, the hollow arrow shaft flexes slightly along its length in an oscillatory motion. Specifically, the action of shooting the arrow from the bow creates a deflection along the length of the arrow, which oscillates as the arrow travels. As a result, archers generally choose the arrow shaft and its components to match their equipment and to meet their shooting requirements. This includes choosing an arrow shaft having the correct length, weight, and stiffness. Archers chose an arrow shaft with a defined static spine, which is the stiffness of the arrow shaft and its resistance to bending. Based on their chosen arrow shaft and corresponding static spine, they then add tips, fletching, and nocks to tune the dynamic spine, which is the deflection of the arrow when fired from a bow. The physical properties of the arrow shaft, including the overall weight and the center of gravity of the arrow, affects the arrow performance.

For a specific arrow shaft having a particular length and static spine, the change in weight will adversely affect the static spine of the arrow shaft. The static spine of an arrow shaft is generally determined by the material of the arrow shaft, the thickness of the arrow shaft walls, and the length of the arrow shaft. Changing weight between arrow shafts made of the same carbon fiber material with the same length requires changing the wall thickness of the arrow shaft. The thinner walled arrows shafts will be lighter, but will have a lower static spine because the stiffness of the arrow shaft would decrease. Altering any one of the properties of the arrow shaft will affect the other. This limits the ability of the archer to choose a particular carbon fiber arrow shaft having a specific weight, length, and diameter with a specific static spine.

In light of the above, it would be advantageous to provide a lightweight arrow shaft having an overall stiffness comparable to the stiffness of a heavier arrow shaft. It would further be advantageous to provide a thin walled arrow shaft having an overall stiffness comparable to a thicker walled arrow shaft. It would further be advantageous to provide an arrow shaft with internal bracing with stiffness comparable to heavier weighted arrow shafts.

SUMMARY OF THE INVENTION

The present invention is a lightweight archery arrow having an arrow shaft with internal bracing. The arrow shaft with internal bracing is a cylindrical tube having a plurality of ribs formed along the length of the cylindrical tube. Due to the deflection of the arrow shaft being perpendicular from its length, the ribs are formed parallel with the length of the cylindrical tube. By orienting the ribs perpendicular to the deflection and parallel with the cylindrical tube, the ribs provide maximum bending stiffness to the cylindrical tube by increasing the moment of inertia. The ribs increase the bending stiffness of the cylindrical tube without adding additional thickness and weight. Due to the increased bending stiffness of the cylindrical tube provided by the ribs, the wall thickness of the cylindrical tube may be reduced while still maintaining the bending stiffness comparable to that of an arrow shaft having a thicker wall. The decrease in wall thickness and the reduction of material reduces the weight of the arrow shaft. This allows the arrow shaft with internal bracing to have an exterior diameter and bending stiffness comparable to that of a standard arrow shaft with a lighter weight.

The arrow shaft with internal bracing utilizes proprietary arrow tips, nocks, and inserts. The arrow tips and nocks are formed with a shaft having grooves, which correspond to the ribs of the arrow shaft with internal bracing, to allow the insertion of the arrow tips and nocks directly into the arrow shaft with internal bracing. The inserts have a body having grooves to correspond to the ribs of the arrow shaft with internal bracing to allow the insertion of the inserts directly into the arrow shaft with internal bracing. The inserts have either a threaded bore or a smooth bore corresponding to the shaft of standard arrow tips or nocks. When inserted into the arrow shaft with internal bracing, the inserts allow the attachment of standard arrow tips and nocks to the arrow shaft with internal bracing.

An alternative embodiment of the arrow shaft with internal bracing is a cylindrical tube having a plurality of ribs having a predetermined length formed along the length of the cylindrical tube where portions of the ribs are removed from both ends of the cylindrical tube to provide a smooth bore to accommodate standard arrow tips, nocks, and inserts. In another alternative embodiment, the arrow shaft with internal bracing is a cylindrical tube having a plurality of ribs formed along the length of the cylindrical tube at an angle. The plurality of ribs may be formed within the cylindrical tube as a spiral, helix, or other similar patterns.

The arrow shaft with internal bracing is formed on a mandrel formed with grooves corresponding to the desired ribs of the resulting arrow shaft with internal bracing. Material is placed on the mandrel and the grooves on the mandrel are filled with the material. The material is cured. With the aid of releasing agents, the mandrel is removed leaving a cylindrical tube having a plurality of ribs formed on the interior of the cylindrical tube. To create a smooth bore at both ends of the cylindrical tube, the portions of the ribs may be removed by grinding or other material removal methods known in the art.

BRIEF DESCRIPTION OF THE DRAWINGS

The nature, objects, and advantages of the present invention will become more apparent to those skilled in the art after considering the following detailed description in connection with the accompanying drawings, in which like reference numerals designate like parts throughout, and wherein:

FIG. 13 is a perspective view of an arrow shaft with internal bracing mandrel;

FIG. 14 is a side view of the arrow shaft with internal bracing mandrel;

FIG. 15 is a front view of the arrow shaft with internal bracing mandrel;

FIG. 16 is a back view of the arrow shaft with internal bracing mandrel;

DETAILED DESCRIPTION OF THE INVENTION

The description that follows includes preferred embodiments of the present invention, which are exemplary and specifically described with reference to the drawings. However, dimensions, materials, shapes, relative arrangements, and other constituent elements described in the following embodiments may be changed depending on the conditions of the various elements or devices or apparatuses to which the present invention is applied. Therefore, the scope of the present invention is not limited to the precise disclosure unless otherwise specified. For example, while the disclosure generally relates to archery arrows and arrow shafts, a person of skill in the art would appreciate that the teachings are applicable to crossbow bolts.

Figure 1:
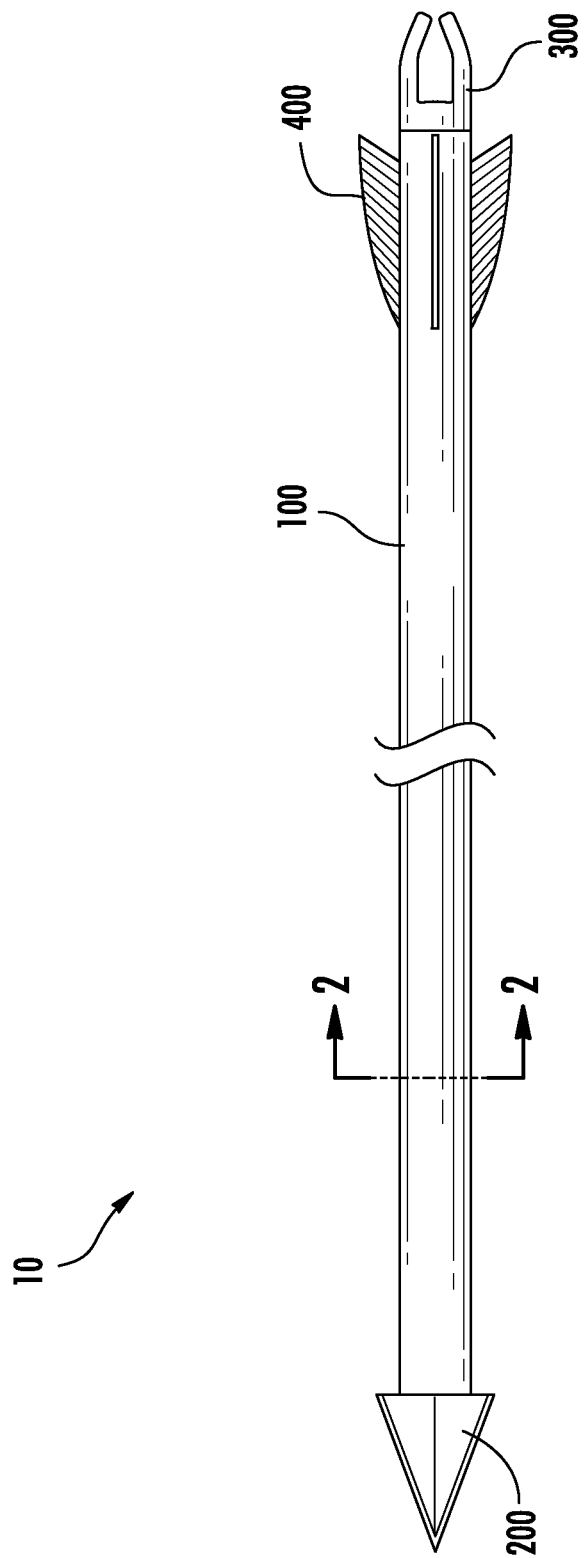
FIG. 1 is a perspective view of an arrow having an arrow shaft with internal bracing with a tip, fletching, and nock.
Figure 2:
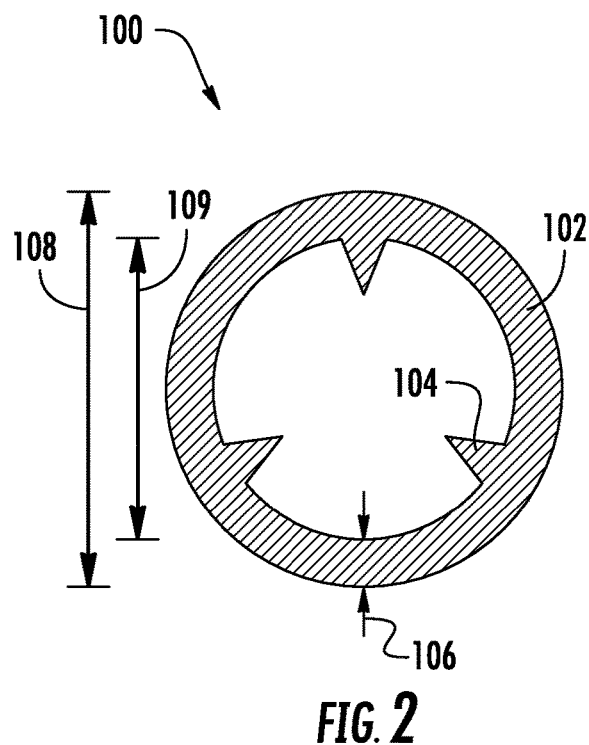
FIG. 2 is a cross-section view taken along lines 2-2 of FIG. 1 of the arrow shaft with internal bracing.

Referring initially to FIG. 1, a preferred embodiment of the arrow of the present invention is shown and generally designated 10. The arrow 10 includes an arrow shaft with internal bracing 100, an arrow tip 200, a nock 300, and fletching 400. The arrow shaft with internal bracing 100 is a cylindrical tube having a plurality of ribs, or protrusions, running along the length of the arrow shaft with internal bracing 100. As shown in FIG. 2, the arrow shaft with internal bracing 100 is a cylindrical tube 102 with an outside diameter 108, inside diameter 109, and a wall thickness 106. A plurality of ribs 104 is formed along the length of the cylindrical tube 102. In the preferred embodiment of the arrow shaft 100, three ribs 104 are formed on the interior of the cylindrical tube 102 and span the entire length of the cylindrical tube 102. Due to the deflection of the arrow shaft 100 being perpendicular from its length, the ribs 104 are formed parallel with the length of the cylindrical tube 102. By orienting the ribs 104 perpendicular to the deflection and parallel with the cylindrical tube 102, the ribs 104 provide maximum bending stiffness to the cylindrical tube 104 by increasing the moment of inertia. The arrow shaft can be made by molding fiber reinforced plastic, pultruding carbon fiber, or casting a metal, such as aluminum. The arrow shaft can be formed from any other material known to those of skill in that art.

Figure 2A:
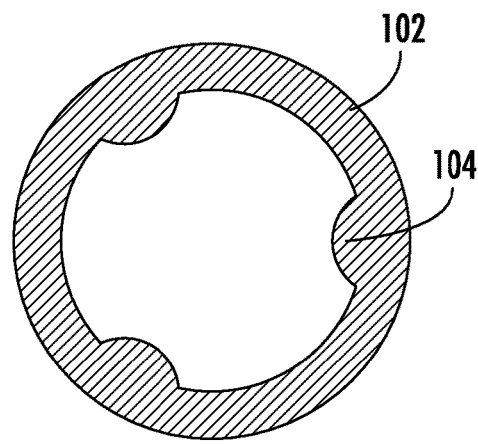
FIG. 2A is a cross-section view of an alternative arrow shaft with internal bracing having an alternative interior bore.
Figure 2B:
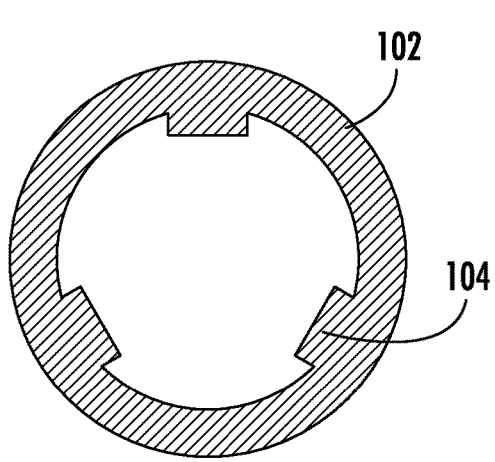
FIG. 2B is a cross-section view of an alternative arrow shaft with internal bracing having an alternative interior bore.
Figure 2C:
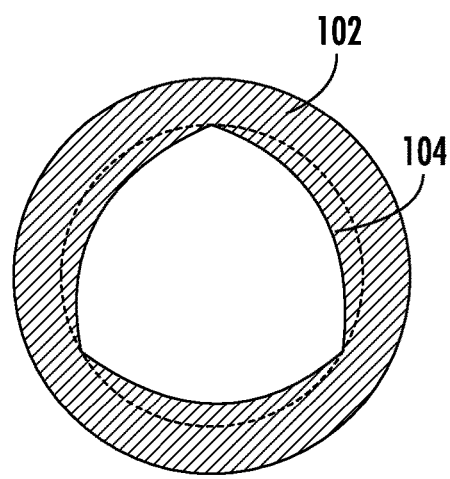
FIG. 2C is a cross-section view of an alternative arrow shaft with internal bracing having an alternative interior bore.

The number and shape of the ribs 104 is not meant to be limiting and it is contemplated that various numbers of ribs 104 and various different shapes may be formed with the cylindrical tube 102 to vary the stiffness of the arrow shaft 100. As shown, the ribs 104 have a triangular shape. The triangular shape of the ribs 104 in FIG. 2 are not meant to be limiting and it is contemplated that various others shapes may be used such as the circular shape as shown in FIG. 2A, a quadrilateral shape as shown in FIG. 2B, a crescent shape as shown in FIG. 2C, or any other shape without departing from the scope and spirit of the invention. It is further contemplated that the internal bore of the arrow shaft with internal bracing 100 may be a different shape such as a circular shape, quadrilateral shape, and triangular shaped or any other shape without departing from the scope and spirit of the invention.

The ribs 104 increase the bending stiffness of the cylindrical tube 102 without adding thickness and weight. Due to the increased bending stiffness of the cylindrical tube 102 provided by the ribs 104, the wall thickness 106 of the cylindrical tube 102 may be reduced while still maintaining the bending stiffness comparable to that of an arrow shaft having a thicker wall. The decrease in wall thickness and the reduction of material reduces the weight of the arrow shaft 100. This allows the arrow shaft with internal bracing 100 to have an exterior diameter 108 and bending stiffness comparable to that of a standard arrow shaft, but being lighter in weight. The arrow shaft with internal bracing 100 is a lightweight, high-strength arrow shaft.

Figure 3:
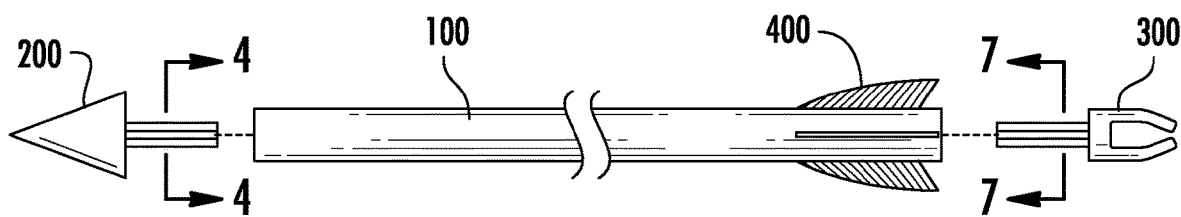
FIG. 3 is an exploded view of the arrow of FIG. 1.
Figure 4:
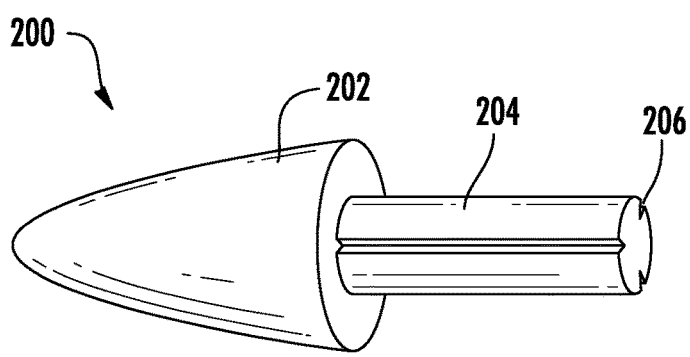
FIG. 4 is a perspective view of the arrow tip in FIG. 3.
Figure 5:
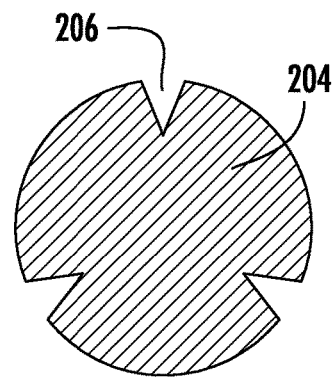
FIG. 5 is a cross-section view of the shaft of the arrow tip taken along lines 4-4 of FIG. 3.
Figure 6:
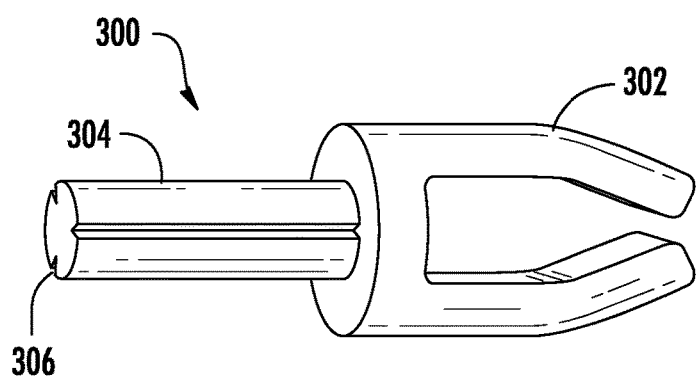
FIG. 6 is a perspective view of the nock of FIG. 3.
Figure 7:
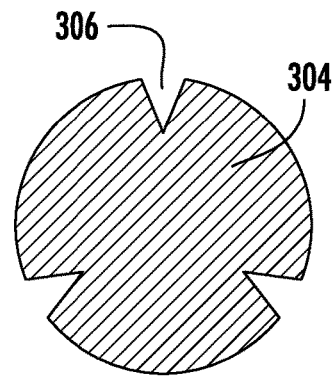
FIG. 7 is a cross-section view of the nock shaft of the nock taken along lines 7-7 of FIG. 3.

Referring now to FIG. 3, an exploded view of the arrow 10 is shown. The arrow 10 includes the arrow shaft with internal bracing 100, an arrow tip 200, fletching 400, and a nock 300. The arrow tip 200 includes a point 202 and a point shaft 204 formed with grooves 206 (shown in FIG. 4 and FIG. 5). The nock includes a nock body 302 and a nock shaft 304 formed with grooves 306 (shown in FIG. 6 and FIG. 7). The point shaft grooves 206 and the nock shaft grooves 306 correspond with the ribs 104 of the arrow shaft 100. This allows the point shaft 204 and the nock shaft 304 to be inserted into the arrow shaft 100.

The arrow tip 200 and nock 300 are internally fitted components that fit inside of an the arrow shaft 100. Non-limiting examples of internally fitted components that are arrow tips include broadhead adapters and target points. Non-limiting examples of internally fitted components that are nocks include standard nocks and lighted nocks. An insert may be an internally fitted component or may be used with an internally fitted component to fit an arrow tip or nock inside of arrow shaft. Non-limiting examples of inserts include screw-in inserts, standard inserts, and threaded inserts. Internally fitted components are specifically made to be disposed in the arrow shaft.

Figure 8:
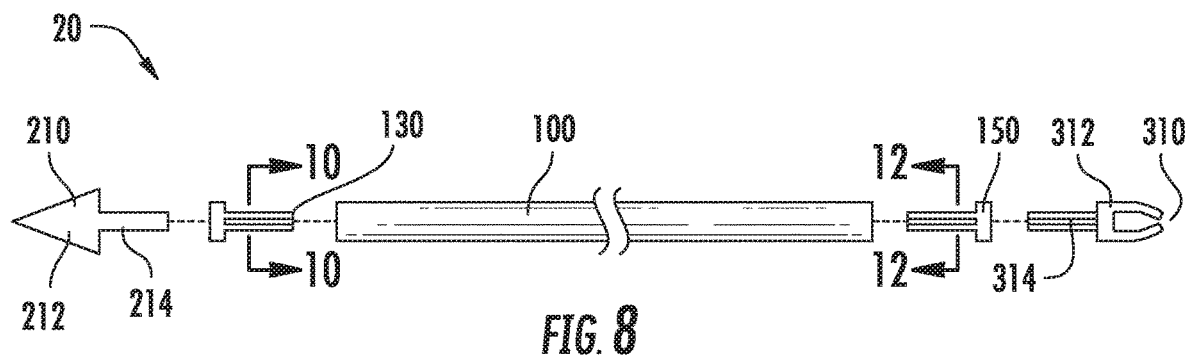
FIG. 8 is an exploded view of an alternative embodiment of an arrow having the arrow shaft with internal bracing, an threaded bore insert, an arrow tip, a smooth bore insert, and a nock.
Figure 9:
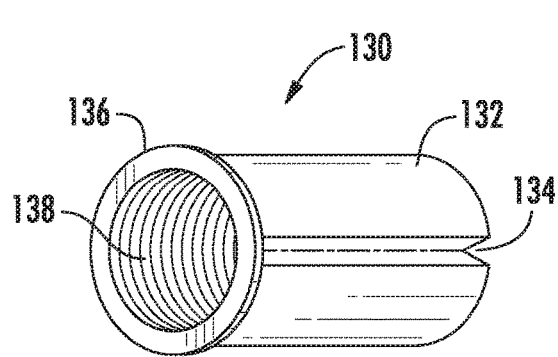
FIG. 9 is a perspective view of the threaded bore insert of FIG. 8.
Figure 10:
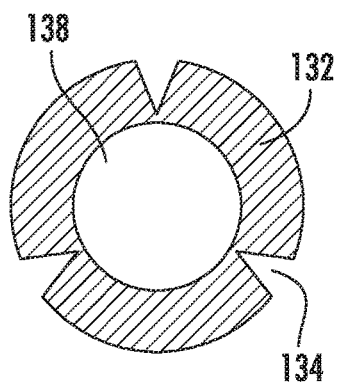
FIG. 10 is a cross-section view of the threaded bore insert of the arrow tip taken along lines 10-10 of FIG. 8.
Figure 11:
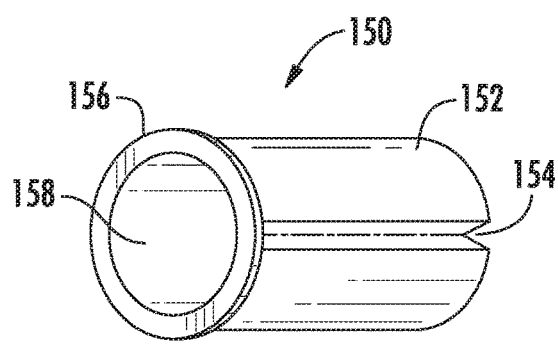
FIG. 11 is a perspective view of the smooth bore insert of FIG. 8.
Figure 12:
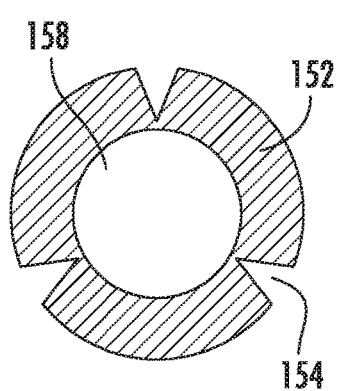
FIG. 12 is a cross-section view of the smooth bore insert along lines 12-12 of FIG. 8.

Referring now to FIG. 8, in conjunction with FIGS. 9-12, an alternative embodiment of the arrow is shown and generally designated 20. The arrow 20 includes the arrow shaft with internal bracing 100, a threaded bore insert 130, a standard arrow tip 210, a smooth bore insert 150, and a standard nock 310. The threaded bore insert 130 includes an elongated cylindrical body 132 formed with a threaded bore 138 extending a predetermined distance into the cylindrical body 132. The elongated cylindrical body 132 is further formed with a collar 136 on its open end. Formed into the exterior of the elongated cylindrical body 132 are grooves 134 corresponding to the ribs 104 of the arrow shaft. The smooth bore insert 150 includes an elongated cylindrical body 152 formed with a smooth bore 158 extending a predetermined distance into the cylindrical body 152. The elongated cylindrical body 152 is further formed with a collar 156 on its open end. Formed into the exterior of the elongated cylindrical body 152 are grooves 154 corresponding to the ribs 104 of the arrow shaft. It is contemplated that the threaded bore insert 130 and the smooth bore insert 150 may be modified to accommodate any standard sized arrows tips and nocks by modifying the corresponding threaded bore 138 and smooth bore 158. Further, it is contemplated that the threaded bore insert 130 and smooth bore insert 150 may be used to accept both arrow tips and nocks.

The threaded bore insert 130 and the smooth bore insert 150 allows the use of standard arrow tips 210 and nocks 310 with the arrow shaft with internal bracing 100. The ribs 104 of the arrow shaft with internal bracing 100 and the grooves 134 of the elongated cylindrical body 132 have enough clearance to allow the insertion of the elongated cylindrical body 132 into the arrow shaft with internal bracing 100. Once inserted into the arrow shaft with internal bracing 100, the collar 136 rests against the edge of the arrow shaft with internal bracing 100. Similarly, the grooves 154 formed on the elongated cylindrical body 152 have enough clearance to allow the insertion of the smooth bore insert 150 into the arrow shaft 100. The arrow tip 210 has a point with a threaded shaft 214. The threaded bore 138 of the thread bore insert 130 corresponds with the threaded shaft 214. The arrow tip 210 is attached to the arrow shaft with internal bracing 100 by threading the threaded shaft 214 into the threaded bore 138. On the opposite end, the nock 310 with the nock body 312 and shaft 314 is attached to the smooth bore insert 150 by inserting the shaft 314 into the smooth bore 158, where the smooth bore 158 is formed to accommodate the shaft 314. The exterior diameter 108 of the arrow shaft 100 being the same as standard arrows allow the seamless integration of the standard arrow tips 210 and nocks 310 when used in conjunction with the threaded bore insert 130 and the smooth bore insert 150.

Referring now to FIG. 13, in conjunction with FIGS. 14-16, an arrow shaft with internal bracing mandrel is shown and generally designated 500. The arrow shaft with internal bracing mandrel 500 is used to form and manufacture the arrow shaft with internal bracing 100. The arrow shaft with internal bracing mandrel 500 includes an elongated body 502 with a diameter 506 and length 508. Along the length of the elongated body 502 are grooves 504 formed into the elongated body 502. The grooves 504 correspond to the desired shape, size, and orientation of the ribs 104 within the cylindrical shaft 102 of the arrow shaft with internal bracing 100. As shown, the grooves 504 are triangular in shape. The diameter 506 of the arrow shaft with internal bracing mandrel 500 corresponds to the desired internal diameter of the arrow shaft 100.

Figure 17:
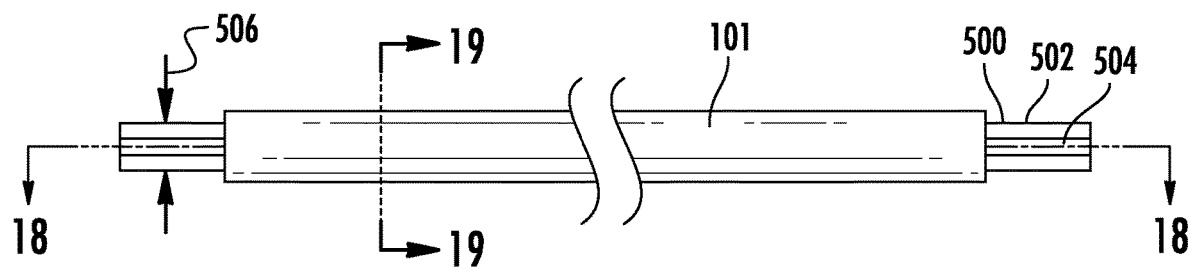
FIG. 17 is a side view of an arrow shaft with internal bracing mandrel with carbon fiber material wrapped around the arrow shaft with internal bracing mandrel.
Figure 18:
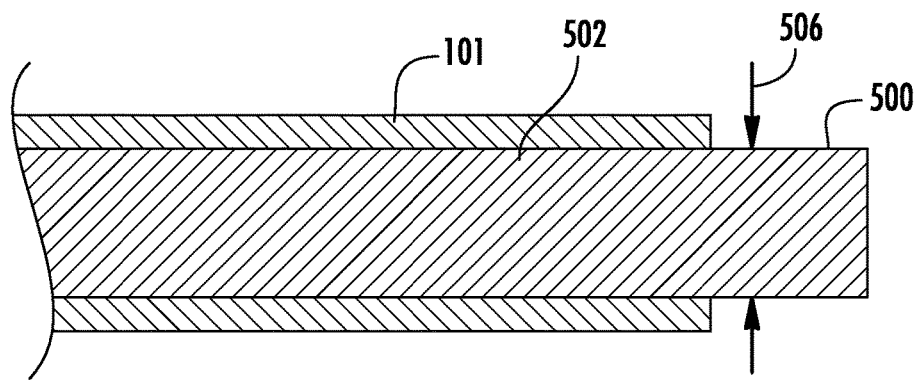
FIG. 18 is a cross-section view of the arrow shaft with internal bracing mandrel and carbon fiber taken along lines 18-18 of FIG. 17.
Figure 19:
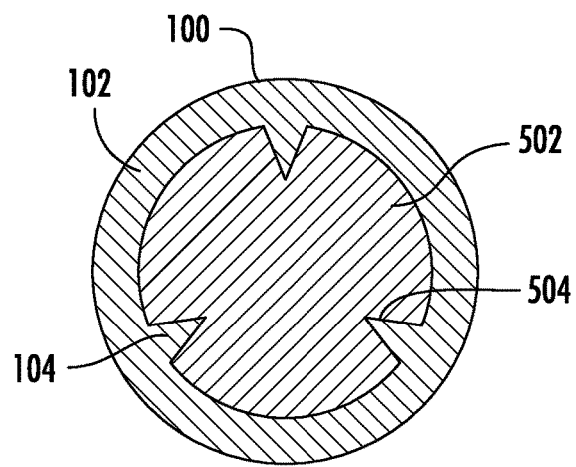
FIG. 19 is a cross-section view of the arrow shaft with internal bracing mandrel and carbon fiber taken along lines 19-19 of FIG. 17.

An example of a manufacturing method for the arrow shaft with internal bracing 100 is depicted in FIG. 17. Carbon fiber manufacturing is known in the art, and includes the wrapping of carbon fibers around a mandrel and impregnated with epoxy which is then heated and formed into the desired article of manufacture. For the present invention, a side view of the manufacturing method shows the use of the arrow shaft with internal bracing mandrel 500 wrapped with carbon fiber material 101. As shown in FIG. 19, the cross-section view taken along lines 19-19 of FIG. 17 shows the carbon fiber material 101 filling up the grooves 504 of the arrow shaft with internal bracing mandrel 500 to form the ribs 104 of the arrow shaft with internal bracing 100. Alternatively, the grooves 504 may be filled with another material to form the ribs 104 of the reinforced arrows shaft 100. The diameter 506 of the arrow shaft with internal bracing mandrel 500 forms the interior diameter 109 of the arrow shaft with internal bracing 100 and the amount of carbon fiber material 101 wrapped around the arrow shaft with internal bracing mandrel 500 forms the exterior diameter 108 of the arrow shaft 100. As shown in FIG. 18, a cross-section view of the arrow shaft with internal bracing mandrel 500 wrapped with carbon fiber material 101 taken along lines 18-18 of FIG. 17 shows the uniformity of the arrow shaft with internal bracing mandrel 500. This allows the arrow shaft with internal bracing mandrel 500 to be removed in either direction from the carbon fiber material 101 once the manufacturing process is complete.

Figure 20:
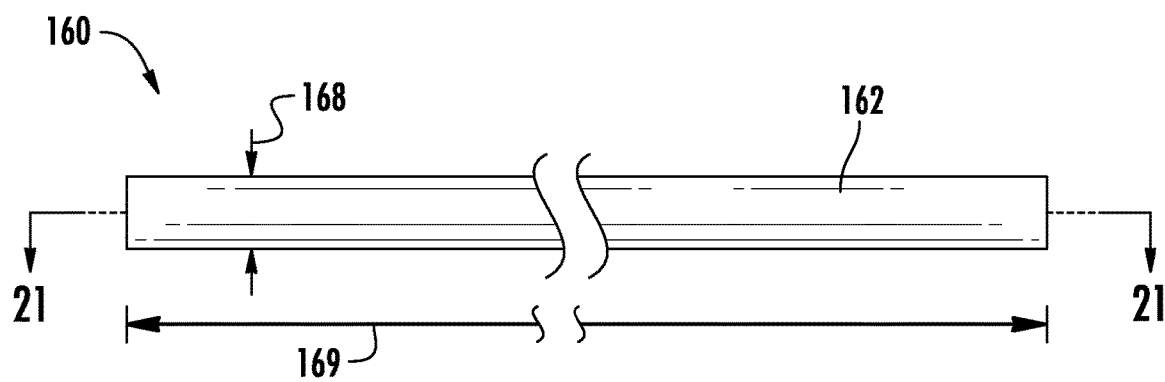
FIG. 20 is a side view of an alternative embodiment of the arrow shaft with internal bracing.
Figure 21:
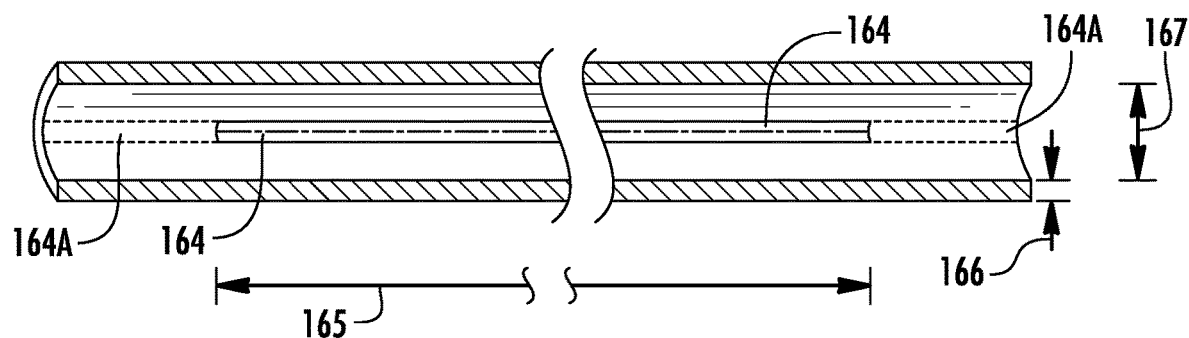
FIG. 21 is a cross-section view of the arrow shaft with internal bracing taken along lines 21-21 of FIG. 20.
Figure 22:
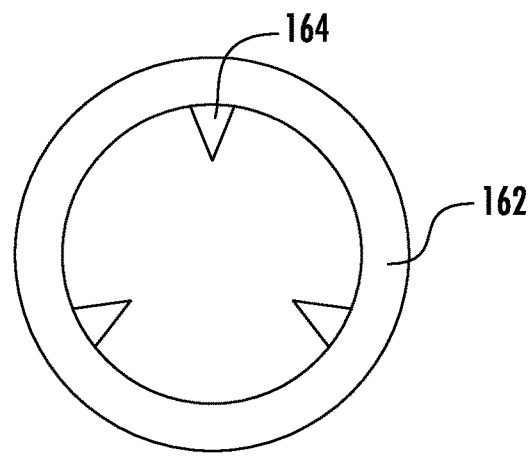
FIG. 22 is a front view of the arrow shaft with internal bracing.

Referring now to FIG. 20, in conjunction with FIGS. 21 and 22, an alternative embodiment of the arrow shaft with internal bracing is shown and generally designated 160. The arrow shaft with internal bracing 160 is a cylindrical tube 162 having an inside diameter 167, an outside diameter 168, a length 169, and a wall thickness 166. The interior of the cylindrical tube 162 has a plurality of ribs 164 with a predetermined length 165 formed along its length. A portion 164A of the ribs 164 is removed from both ends of the cylindrical tube 162 to create a smooth bore opening. This enables the use of standard arrow tips, nocks, and various accessories with the arrow shaft with internal bracing 160.

Arrow shaft with internal bracing 160 is manufactured using similar steps used to manufacture the arrow shaft with internal bracing 100. After the removal of the carbon fiber material 101 from the arrow shaft with internal bracing mandrel 500, an additional step is performed on the processed carbon fiber material 101. The removed carbon fiber material 101 is formed into a cylindrical tube 162 with ribs 164 running the entirety of the length 169 of the cylindrical tube. The portion 164A of the ribs 164 is removed by using a variety of techniques, such as by grinding or other material removal methods known in the art. This creates a cylindrical tube 162 with ribs 164 with a predetermined length 165 and the creation of the smooth bore opening on the cylindrical tube 162.

Figure 23:
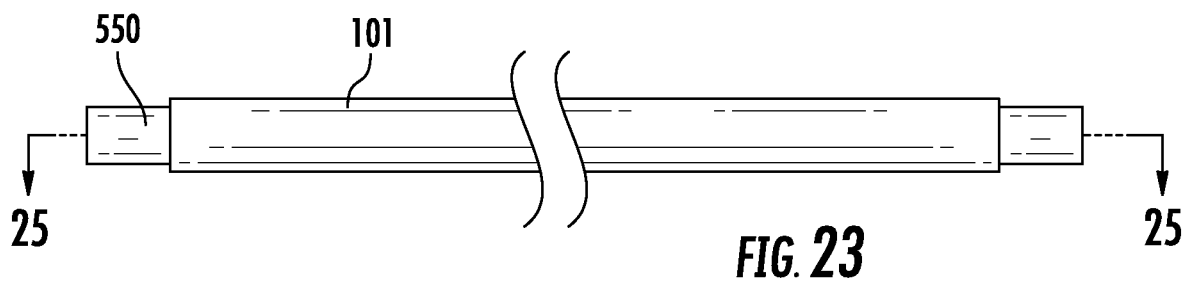
FIG. 23 is show an alternative embodiment of a mandrel with carbon fiber material wrapped around the mandrel.
Figure 24:
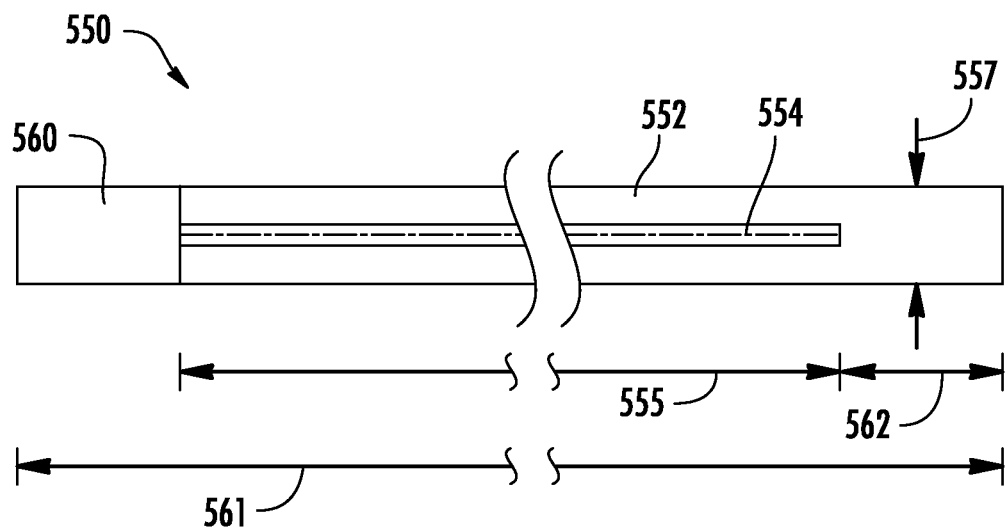
FIG. 24 is a side view of the alternative embodiment of the mandrel.
Figure 25:
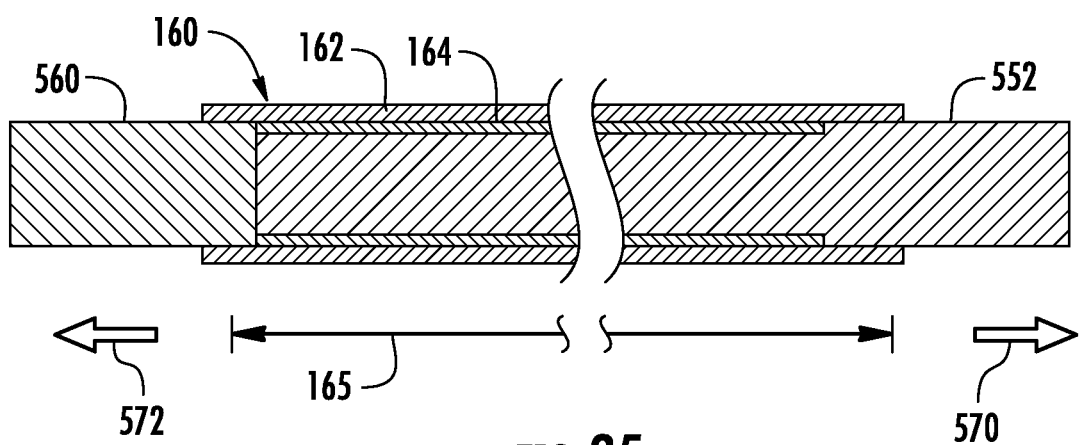
FIG. 25 is a cross-section view of the alternative embodiment of a mandrel with carbon fiber material wrapped around the mandrel taken along lines 25-25 of FIG. 23.

Referring now to FIGS. 23-25, an alternative manufacturing method for arrow shaft with internal bracing 160 is shown. A mandrel 550 is provided and wrapped with carbon fiber material 101. The mandrel 550 has a first body 552 formed with a groove 554 having a predetermined length 555 corresponding with the length 165 of the ribs 164 of the arrow shaft 160. The groove 554 abuts one end of the first body 552 while ending a distance 562 before the second end of the first body 552. Removably attached to the first end of the first body 552 is a second body 560. The second body 560 is not formed with any grooves. The first body 552 and second body has a diameter 557, corresponding to the diameter 167 of the arrow shaft 160, and when attached together has a total length 561. When attached together, first body 552 and second body 560 form mandrel 550.

As shown in FIG. 25, the cross-section view taken along lines 25-25 of FIG. 23 shows the carbon fiber material 101 filling up the grooves 554 of the first body 552 to form the ribs 164 of the arrow shaft with internal bracing 160. Alternatively, the grooves 554 may be filled with another material to form the ribs 164 of arrows shaft 160. The first body at distance 562 and the second body 560 are void of grooves 554 and thus no ribs 164 are formed in the arrow shaft 160 at the corresponding locations. The diameter 557 of the mandrel 550 forms the interior diameter 167 of the arrow shaft 160 and the amount of carbon fiber material 101 wrapped around the mandrel 550 forms the exterior diameter of the arrow shaft 160.

When the carbon fiber material 101 is cured, arrow shaft 160 is formed. To remove the mandrel 550 from the arrow shaft 160, the first body 552 is detached from the second body 560. The first body 552 is removed from the arrow shaft 160 in direction 570 and the second body 560 is removed from the arrow shaft 160 in direction 572. The separation of the mandrel 550 into two pieces allows the mandrel to be removed from the arrow shaft. Without separation of the mandrel 550, the ribs 164 of the arrow shaft 164 will prevent the mandrel 550 from being removed because the second body 560 without grooves and the first body 550 without grooves will be an obstruction preventing the removal of the arrow shaft 160.

Figure 26:
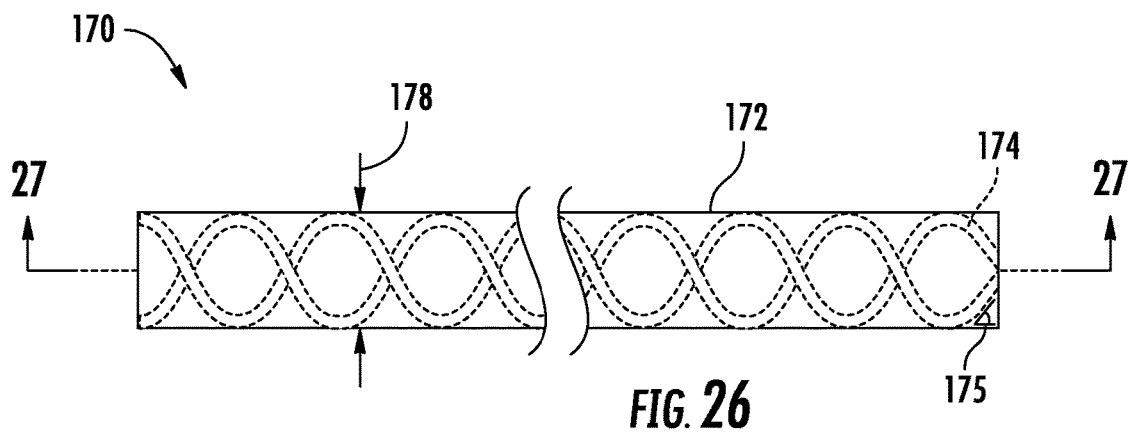
FIG. 26 is a side view of an alternative embodiment of the arrow shaft with internal bracing showing the ribs in dashed lines.
Figure 27:
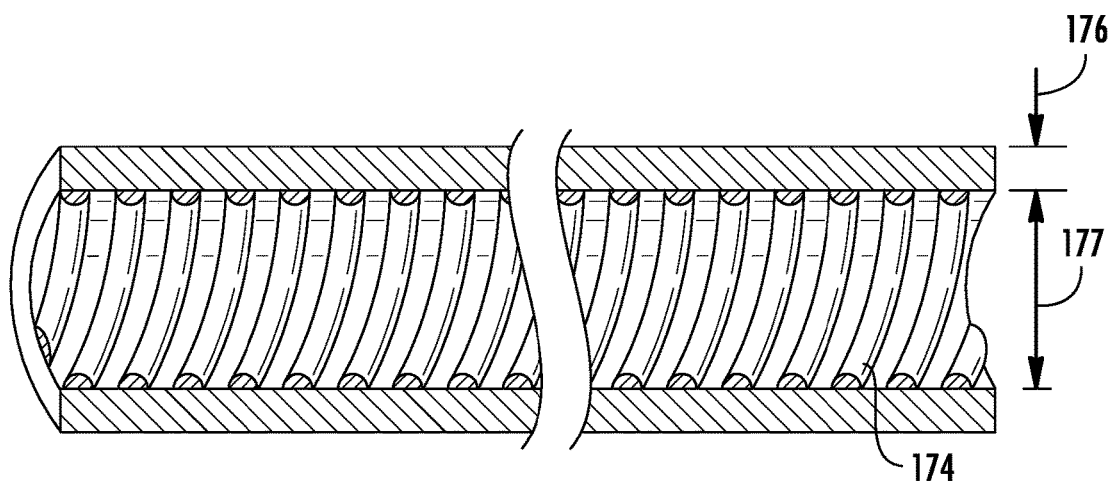
FIG. 27 is a cross-section view of the arrow shaft taken along lines 27-27 of FIG. 26.

Referring now to FIG. 26 and FIG. 27, an alternative embodiment of an arrow shaft with internal bracing is shown and generally designated 170. The arrow shaft with internal bracing 170 is a cylindrical tube 172 with a wall thickness 176 having a plurality of ribs 174 running along the length of the cylindrical tube 172 in a spiral pattern. In the preferred embodiment of the arrow shaft 172, two ribs 174 are formed on the interior of the cylindrical tube 172 and span the entire length of the cylindrical tube 172. Due to the deflection of the arrow shaft 170 being perpendicular from its length coupled with the constant rotation of the arrow shaft 170, the ribs 174 are formed as a spiral running along the length of the cylindrical tube 172 at an angle 175. Angle 175 can be between 0 and 90 degrees. By orienting the ribs 174 in this manner, the ribs 174 provide additional bending stiffness to the cylindrical tube 172. The number and shape of the ribs 174 is not meant to be limiting and it is contemplated that various numbers of ribs 174 and various different shapes may be formed with the cylindrical tube 172 to vary the stiffness of the arrow shaft 170. As shown, the ribs 174 have a circular shape. As described above, the ribs 174 increase the bending stiffness of the cylindrical tube 174 without adding thickness and weight.

Figure 28:
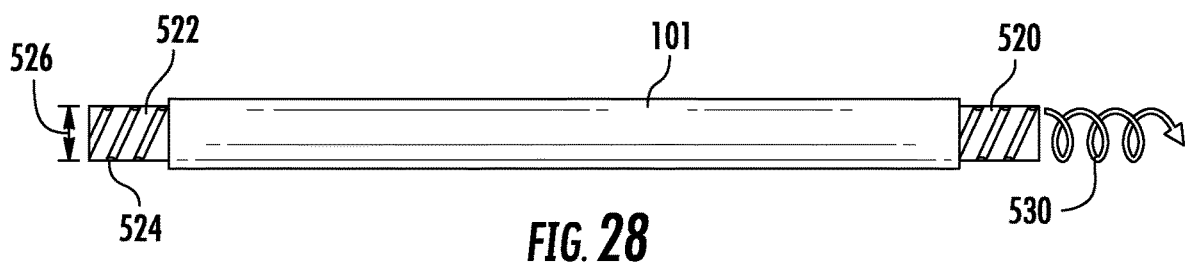
FIG. 28 is a side view of an alternative embodiment of the reinforced arrow shaft mandrel with carbon fiber material wrapped around the mandrel to form the alternative embodiment of the arrow shaft with internal bracing.

An example of a manufacturing method for the arrow shaft with internal bracing 170 is depicted in FIG. 28. Carbon fiber manufacturing is known in the art, and includes the wrapping of carbon fibers around a mandrel and impregnated with epoxy which is then heated and formed into the desired article of manufacture. For the present invention, a side view of the manufacturing method shows the use of the arrow shaft with internal bracing mandrel 520 wrapped with carbon fiber material 101. The arrow shaft with internal bracing mandrel 520 is has an elongated cylindrical body 522 with a diameter 526 and formed with spiral grooves 524. The carbon fiber material 101 fills up the grooves 524 of the arrow shaft with internal bracing mandrel 520 to form the ribs 174 of the arrow shaft with internal bracing 170. The diameter 526 of the arrow shaft with internal bracing mandrel 520 forms the interior diameter of the arrow shaft with internal bracing 170 and the amount of carbon fiber material 101 wrapped around the arrow shaft with internal bracing mandrel 520 forms the exterior diameter of the arrow shaft 170. After the process is complete and the carbon fiber material 101 is processed into arrow shaft with internal bracing 170, the arrow shaft with internal bracing mandrel 520 is removed in direction 530. Direction 530 includes the rotation of the arrow shaft with internal bracing mandrel 520 as the arrow shaft with internal bracing mandrel 520 is advanced out. It is contemplated the mandrel may be removed in the opposite of direction 530. It is further contemplated that the arrow shaft with internal bracing may be rotated while advancing the arrow shaft with internal bracing mandrel 520 out.

Although the present invention has been described herein with respect to preferred and alternative embodiments thereof, the forgoing descriptions are intended to be illustrative, and not restrictive. Those skilled in the art will realize that many modifications of the preferred and alternative embodiments could be made which would be operable, such as combining the various aspects of each preferred and alternative embodiments. All such modifications which are within the scope of the claims are intended to be within the scope and spirit of the present invention.

The above description sets forth, rather broadly, a summary of the disclosed embodiments. There may be, of course, other features of the disclosed embodiments that will be appreciated by a person of skill in the art based on the description and may form the subject matter of claims. The features, functions, and advantages that have been discussed can be achieved independently in various embodiments of the disclosure or may be combined in yet other embodiments, further details of which can be seen with reference to the description and drawings.

The order in which the steps are presented is not limited to any particular order and does not necessarily imply that they have to be performed in the order presented. It will be understood by those of ordinary skill in the art that the order of these steps can be rearranged and performed in any suitable manner. It will further be understood by those of ordinary skill in the art that some steps may be omitted or added and still fall within the spirit of the invention. Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting. Although specific terms are employed herein, they are used in a generic and descriptive sense only and not for purposes of limitation.

The invention is not limited in its application to the details of the construction and to the arrangement of the components set forth in the above description or as illustrated in the drawings. While it has been shown what are presently considered to be preferred embodiments of the present invention, it will be apparent to those skilled in the art that various changes and modifications can be made herein without departing from the scope and spirit of the invention.

What is claimed is:

1. A method for manufacturing an internally fluted arrow shaft configured for attachment with an arrow shaft accessory or component, the method comprising:
    rolling a carbon fiber material around an externally grooved mandrel having linear grooves extending longitudinally along a length of the grooved mandrel;
    curing the carbon fiber material over the grooved mandrel to form the arrow shaft as a cylindrical tube having an essentially round cross-section along the outer surface thereof and an inner surface defining spaced internal linear ribs formed in correspondence with the mandrel grooves essentially parallel to the length of the arrow shaft; and
    removing the grooved mandrel from the arrow shaft.

2. The method of claim 1 further comprising removing material from the inside diameter of the arrow shaft to create a smooth bore after said removing of the grooved mandrel.

3. The method of claim 1 wherein the carbon fiber material comprises a first unidirectional carbon fiber material.

4. The method of claim 3 wherein the first unidirectional carbon fiber material is rolled at an essentially 0 degree angle to the longitudinal axis of the grooved mandrel.

5. The method of claim 3 further comprising wrapping a second unidirectional carbon fiber material around the first unidirectional carbon fiber material.

6. The method of claim 5 wherein the second unidirectional carbon fiber material is wrapped at an essentially 90 degree angle to the longitudinal axis of the grooved mandrel.

7. The method of claim 5 wherein curing the carbon fiber material further comprises curing the first and second unidirectional carbon fiber materials to form said arrow shaft.

8. The method of claim 1 wherein the ribs are formed by the grooved mandrel to span the length of the arrow shaft.

9. The method of claim 8 further comprising removing a portion of the ribs from either an end or from both ends of the arrow shaft to create smooth bore openings configured to accommodate an arrow shaft accessory or component.

10. The method of claim 1 wherein the ribs are formed by the grooved mandrel to span a predetermined length spaced from a first and a second end of the arrow shaft.

11. The method of claim 10 wherein the grooved mandrel comprises a first mandrel body having the grooves and a second mandrel body without the grooves, said removing of the mandrel comprising removing the first and second mandrel bodies from the arrow shaft in opposite directions relative to one another.

12. The method of claim 11 wherein said removing of the mandrel further comprises detaching the first and second mandrel bodies from one another.

13. The method of claim 10 wherein the grooved mandrel comprises a first mandrel body and a second mandrel body, said removing of the mandrel comprising removing the first and second mandrel bodies from the arrow shaft in opposite directions relative to one another.

14. The method of claim 1 wherein the ribs have a cross-section selected from the group consisting of triangular, circular, quadrilateral, or crescent-shaped.

15. The method of claim 1 wherein an internal bore of the arrow shaft from which the ribs project comprises a shape selected from the group consisting of circular, quadrilateral, and triangular.

* * * * *